United States Patent
Anglin et al.

(10) Patent No.: US 9,723,077 B2
(45) Date of Patent: *Aug. 1, 2017

(54) DATA REPLICATION ACROSS SERVERS

(71) Applicant: International Business Machines Corporation, Armonk, NY (US)

(72) Inventors: Matthew J. Anglin, Tucson, AZ (US); Barry Fruchtman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/245,730

(22) Filed: Aug. 24, 2016

(65) Prior Publication Data

US 2016/0352829 A1 Dec. 1, 2016

Related U.S. Application Data (63) Continuation of application No. 15/068,944, filed on Mar. 14, 2016, now Pat. No. 9,516,110, which is a continuation of application No. 14/507,005, filed on Oct. 6, 2014.

(51) Int. Cl.
*H04L 29/08* (2006.01)
*G06F 17/30* (2006.01)

(52) U.S. Cl.
CPC .... *H04L 67/1095* (2013.01); *G06F 17/30575* (2013.01); *H04L 67/1097* (2013.01); *H04L 67/16* (2013.01)

(58) Field of Classification Search
CPC . H04L 67/1095; H04L 67/16; H04L 67/1097; G06F 17/30575; G06F 3/065; G06F 17/30212; G06F 17/30368

USPC ....... 707/610, 614, 623, 626, 633, 635, 639, 707/655, 699, 999.204
See application file for complete search history.

(56) References Cited

U.S. PATENT DOCUMENTS

| | | | |
|---|---|---|---|
| 5,819,020 A * | 10/1998 | Beeler, Jr. | G06F 11/2071 707/999.202 |
| 6,122,630 A * | 9/2000 | Strickler | G06F 17/30575 |
| 6,188,695 B1 * | 2/2001 | Przybysz | H04Q 3/0029 370/410 |
| 6,668,264 B1 * | 12/2003 | Patterson | G06F 11/1471 |

(Continued)

OTHER PUBLICATIONS

List of IBM Patents or Patent Applications Treated as Related, Appendix P, 2 pages, Filed Herewith.

(Continued)

*Primary Examiner* — Mohammed R Uddin
(74) *Attorney, Agent, or Firm* — Alexander G. Jochym (57) ABSTRACT

Embodiments of the present invention provide methods, systems, and computer program products for replicating data between redundant sources. In one embodiment, during a reverse replication process, roles of a source system and target system are altered such that the target system controls the replication process. The target system can identify objects to be transferred, build batches of objects for efficient transfer, and transmit the batches of objects to the source system. Accordingly, embodiments of the present invention can reduce inefficient communication between a source system and a target system that might otherwise occur during replication processes controlled by the source system.

1 Claim, 4 Drawing Sheets

(56) References Cited

U.S. PATENT DOCUMENTS

| | | | |
|---|---|---|---|
| 7,617,369 B1* | 11/2009 | Bezbaruah | G06F 11/2074 707/999.2 |
| 7,653,668 B1 | 1/2010 | Shelat et al. | |
| 7,685,183 B2 | 3/2010 | Pace et al. | |
| 7,761,420 B2* | 7/2010 | Sharma | G06F 11/2066 707/635 |
| 7,769,971 B2* | 8/2010 | Cremelie | G06F 11/2097 707/999.204 |
| 7,917,469 B2 | 3/2011 | Bernhard et al. | |
| 7,930,500 B2 | 4/2011 | Kasako | |
| 8,103,625 B1 | 1/2012 | Pandit | |
| 8,213,332 B2 | 7/2012 | Prasad et al. | |
| 8,239,344 B2 | 8/2012 | Hirakawa et al. | |
| 8,335,761 B1* | 12/2012 | Natanzon | G06F 11/1471 707/626 |
| 8,392,909 B2 | 3/2013 | Anna et al. | |
| 8,677,009 B2* | 3/2014 | Gavrilov | H04L 47/10 709/232 |
| 8,838,539 B1* | 9/2014 | Ashcraft | H04L 67/02 707/637 |
| 8,850,073 B1* | 9/2014 | Wilkes | G06F 11/2066 709/248 |
| 9,317,576 B2* | 4/2016 | Merriman | G06F 17/30578 |
| 2004/0153473 A1 | 8/2004 | Hutchinson et al. | |
| 2004/0260976 A1* | 12/2004 | Ji | G06F 11/2069 714/31 |
| 2005/0081091 A1* | 4/2005 | Bartfai | G06F 11/2058 714/6.31 |
| 2006/0085610 A1* | 4/2006 | Iwamura | G06F 11/1662 711/162 |
| 2006/0117154 A1* | 6/2006 | Suishu | G06F 11/2058 711/162 |
| 2006/0123212 A1 | 6/2006 | Yagawa | |
| 2006/0253624 A1* | 11/2006 | Revah | G06F 11/2058 710/52 |
| 2008/0189340 A1* | 8/2008 | Blea | G06F 17/30575 |
| 2008/0189341 A1* | 8/2008 | Blea | G06F 11/2082 |
| 2008/0244204 A1* | 10/2008 | Cremelie | G06F 11/2097 711/162 |
| 2009/0049054 A1* | 2/2009 | Wong | H04L 67/325 |
| 2009/0144344 A1* | 6/2009 | McBride | G06F 17/30575 |
| 2009/0187613 A1* | 7/2009 | Spear | G06F 11/2069 |
| 2011/0099145 A1 | 4/2011 | Hahn et al. | |
| 2012/0096169 A1 | 4/2012 | Oeda | |
| 2012/0284227 A1 | 11/2012 | Bourbonnais et al. | |
| 2013/0013566 A1* | 1/2013 | Miller | G06F 11/2069 707/655 |
| 2013/0054524 A1* | 2/2013 | Anglin | G06F 17/30575 707/624 |
| 2013/0138607 A1 | 5/2013 | Bashyam et al. | |
| 2013/0191333 A1 | 7/2013 | Long | |
| 2013/0262396 A1* | 10/2013 | Kripalani | G06F 17/30289 707/674 |
| 2015/0154272 A1* | 6/2015 | Elias | G06F 17/30575 707/610 |
| 2015/0378785 A1 | 12/2015 | Tarasuk-Levin et al. | |
| 2016/0020917 A1 | 1/2016 | Tuatini et al. | |
| 2016/0100004 A1 | 4/2016 | Anglin et al. | |
| 2016/0182631 A1 | 6/2016 | Anglin et al. | |
| 2016/0352829 A1 | 12/2016 | Anglin et al. | |

OTHER PUBLICATIONS

Anglin et al., "Data Replication Across Servers", filed Dec. 6, 2016, U.S. Appl. No. 15/369,934, 18 pages.

* cited by examiner

DATA REPLICATION ACROSS SERVERS

BACKGROUND OF THE INVENTION

The present invention relates generally to the field of computer storage systems, and more particularly to ensuring consistency in redundant backup systems.

Replication is a process by which redundant systems ensure consistency and synchronicity across multiple systems. In general, a replication process involves one or more source systems and at least one target system. The source system typically controls the replication process. In some cases, the source system is the primary server being updated and the target system serves as a redundant backup to the source system. In this case, a replication process involves the source system determining what data is on the source system that needs to be added to the target system in order to maintain consistency and synchronicity between the systems. After identifying the data to be transmitted from the source system to the target system, the source system packages the data into batches to efficiently transfer the data from the source system to the target system. In other cases, data may also exist on the target server that needs to be transmitted to the source server in order to maintain consistency and synchronicity among the servers.

SUMMARY

Embodiments of the present invention provide methods, systems, and computer program products for replicating data between redundant sources. In one embodiment, during a reverse replication process, roles of a source system and target system are altered such that the source system transmits a request to the target system for one or more identified objects on the target system. The target system then generates one or more batches of objects comprising the one or more identified objects and transmits the one or more batches of objects to the source computer system.

DETAILED DESCRIPTION

Embodiments of the present invention recognize that the replication process between servers often entails transmitting significant amounts of data among multiple servers in order to maintain consistency and synchronicity among redundant servers. Certain strategies for replication include one or more servers acting as source systems, while one or more other servers act as target systems. The source systems control the replication process. The source systems control the replication process by performing certain functions, such as determining the locations of files to be transferred to another server to maintain synchronicity and organizing the files to be transferred into batches for transmission.

In some cases, data exists on a target system that must be sent to the source system to maintain consistency and synchronicity. This process is known as "reverse replication." In this situation, the source-target architecture becomes inefficient and time-consuming as the source system must acquire information about the data that it lacks from the target system. For example, a source system must determine the location of the files within the target system and the size of the files. The source system then organizes the files to be transferred into batches. The source must then instruct the target system to retrieve the files, batch the files for transmission, and transfer the files to the source system. Such a process results in multiple communications between the source system and the target system to ensure that the source system has the requisite information to direct the reverse replication process. The information that the source system requires to direct the reverse replication is readily available to the target server without requiring additional communication between the source system and the target system. Embodiments of the present invention disclose a mechanism for altering the roles of the source system and the target system during a reverse replication.

Figure 1:
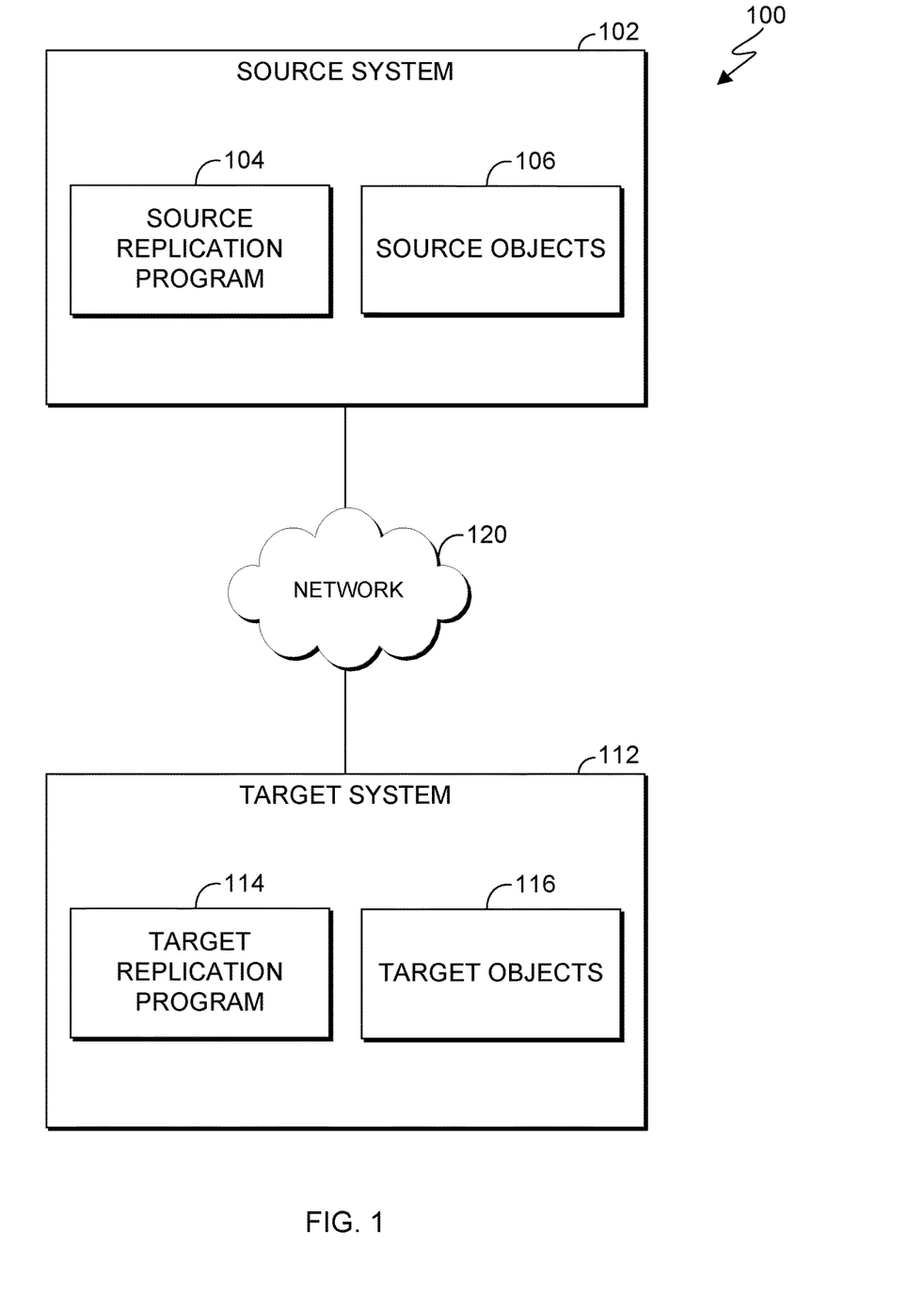
FIG. 1 is a functional block diagram illustrating a server replication environment, in accordance with an embodiment of the present invention.

Embodiments of the present invention will now be discussed with reference to several figures. FIG. 1 is a functional block diagram illustrating a server replication environment ("environment"), generally designated 100, in accordance with an exemplary embodiment of the present invention. Environment 100 includes source system 102 and target system 112 interconnected via network 120.

Network 120 can be, for example, a local area network (LAN), a wide area network (WAN), such as the Internet, a dedicated short range communications network, or any combination thereof, and may include wired, wireless, fiber optic, or any other connection known in the art. In general, the communication network can be any combination of connections and protocols that will support communication between source system 102 and target system 112.

Source system 102 and target system 112 can each be a specialized computer server, a desktop computer, a laptop computer, a tablet computer, a netbook computer, a personal computer (PC), or any other computer system known in the art. In certain embodiments, source system 102 and target system 112 represent computer systems utilizing clustered computers and components that act as a single pool of seamless resources when accessed through network 120, as is common in data centers with cloud computing applications. In general, source system 102 and target system 112 are representative of any programmable electronic devices or combination of programmable electronic devices capable of reading machine readable program instructions and communicating with other computing devices via network 120. Source system 102 and target system 112 may each include internal and external hardware components, as depicted and described in further detail with respect to FIG. 4.

Source system 102 includes source replication program 104 and source objects 106. In the exemplary embodiment of FIG. 1, source replication program 104 is a software application capable of receiving instructions, for example, through a user interface (not shown), and communicating with target system 112 via network 120. Source objects 106 includes data (e.g., computer readable files) and any associated metadata stored on source system 102. In the exemplary embodiment of FIG. 1, source objects 106 represent a set of stored computer objects, such as those stored in a database or file repository, and are intended to be match a similar set of objects (e.g., target objects 116) stored on one or more target systems (e.g., target system 112).

Target system 112 includes target replication program 114 and target objects 116. In the exemplary embodiment of FIG. 1, target replication program 114 is a software application that directs the reverse replication process of objects from target objects 116 to source objects 106 in response to receiving an instruction from source replication program 104 to initiate the reverse replication operation. In the exemplary embodiment of FIG. 1, target objects 116 represent a set of stored computer objects, such as those stored in a database or file repository, and, in a consistent and synchronized environment, contain identical copies of the objects stored in source objects 106. In the event that source system 102 undergoes a period of unavailability (e.g., during maintenance or failure), target objects 116 may be updated independently of source objects 106, necessitating a reverse replication from target system 112 to source system 102 in order to maintain consistency and synchronicity of environment 100.

Target system 112 is a redundant system that provides a back up to source system 102 in the event of maintenance or failure of the source system. In the event of maintenance or failure of source system 102, target system 112 becomes the primary access point to the objects stored in source objects 106 and target objects 116 which, in a synchronized system, will contain copies of identical objects. During the time that source system 102 cannot be accessed (e.g., because of maintenance or failure) target objects 116 can be updated by users accessing target objects 116 on target system 112, for example, through network 120. In some embodiments of the present invention, target system 112 can provide an independent access point for geographically dispersed users attempting to access the data maintained by source system 102 and target system 112. In these embodiments, source system 102 and target system 112 may receive updates to source objects 106 and target objects 116, respectively, independently. In such embodiments, reverse replication may be necessary in order to maintain consistency and synchronicity among source system 102 and target system 112.

Figure 2:
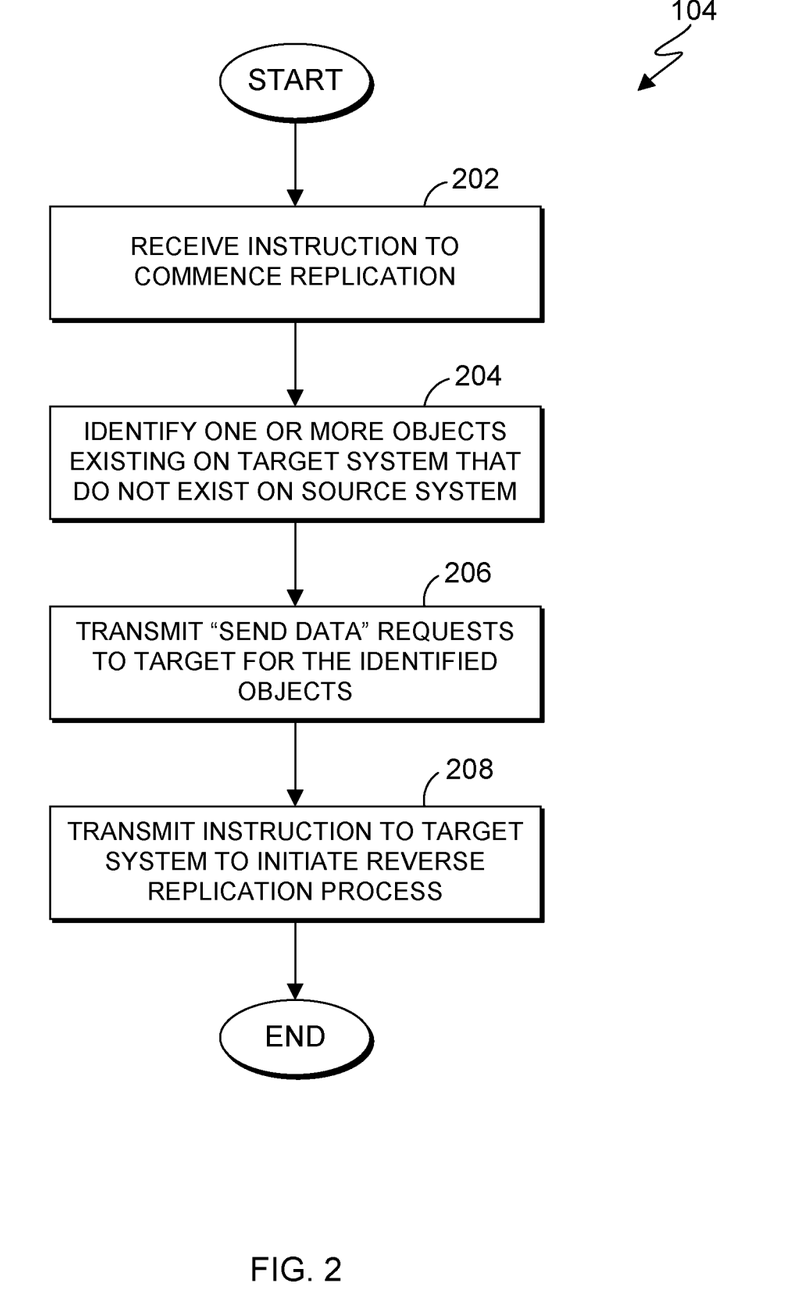
FIG. 2 is a flowchart depicting operational steps of an source replication program, on a source system within the environment of FIG. 1, in accordance with an embodiment of the present invention.

FIG. 2 is a flowchart depicting operational steps of source replication program 104, on source system 102 within environment 100, in accordance with an exemplary embodiment of the present invention.

In step 202, source replication program 104 receives an instruction to commence replication. In the exemplary embodiment of FIG. 2, source replication program 104 receives the instruction to commence replication from a user providing instructions to source system 102, for example, through a user interface. In other embodiments, source replication program 104 can receive the instruction to commence replication based on an automatic instruction generated based on regular time intervals (e.g., daily or hourly replications). In yet other embodiments, source replication program 104 can receive the instruction to commence replication based on a triggering condition. For example, source replication program 104 can receive the instruction to commence replication any time that source system 102 detects that an object stored in source objects 106 is updated.

In step 204, source replication program 104 identifies one or more objects existing on target system 112 that do not exist on source system 102. In the exemplary embodiment of FIG. 2, each system (i.e., source system 102 and target system 112) maintains an updated list of objects and their versions that another system in environment 100 can access and compare to its own list. For example, source system 102 maintains a current list, or log, of the objects stored in source objects 106. In other embodiments, a baseline marker may be used instead of a list, such as a timestamp. If a timestamp is used, the timestamp may be sufficient for each system. The log also includes update and version information about the objects stored in source objects 106. Similarly, target system 112 maintains a list or log of objects stored in target objects 116, as well as any update or version information regarding those target objects. In the exemplary embodiment of FIG. 2, source replication program 104 instructs source system 102 to compare the objects on the source log with those on the target log in order to identify any objects that are in target system 112 that are not in source system 102, including updated versions of previously existing objects. In other embodiments, source system 102 and target system 112 transmit information from one system to the other each time an object on one system is updated or added. In these other embodiments, source replication program 104 identifies one or more objects existing on target system 112 but not on source system 102 by receiving a transmission from target system 112 that informs source replication program 104 that an object in target objects 116 has been updated or added.

In step 206, source replication program 104 transmits a "send data" request to target system 112 for each of the one or more objects identified in step 204 that exist on target system 112 but not on source system 102. As will be appreciated by one skilled in the art, the "send data" request can be in any language understood by source system 102 and target system 112 and capable of communicating a request for data. For example, the "send data" request can be in a structured query language (SQL). In the exemplary embodiment depicted in FIG. 1, source system 102 transmits the "send data" request via network 120.

In step 208, source replication program 104 transmits an instruction to target system 112 to initiate a reverse replication process. In the exemplary embodiment of FIG. 2, source replication program 104 transmits an instruction, via network 120, to target system 112 that instructs target system 112 to initiate target replication program 114. The instruction to initiate the reverse replication process includes instructions for target system 112 to become the controlling system in environment 100. In response to receiving the instruction to initiate the reverse replication process, target system 112 replaces source system 102 as the system controlling the replication process. That is, source system 102 releases control of the replication process to target system 112 at least for the duration of the reverse replication. Alternatively, the source system(s) and the target system(s) may replicate one another simultaneously after differences are determined between the systems. In various embodiments of the present invention, target system 112 becomes the system that identifies the objects to be transferred, builds the batches of files for efficient transfer, and ultimately transfers the objects from target system 112 to source system 102. Accordingly, embodiments of the present invention reduces at least some of the inefficient communication between the source system and the target system that can be necessary when the source system controls the reverse replication process.

Figure 3:
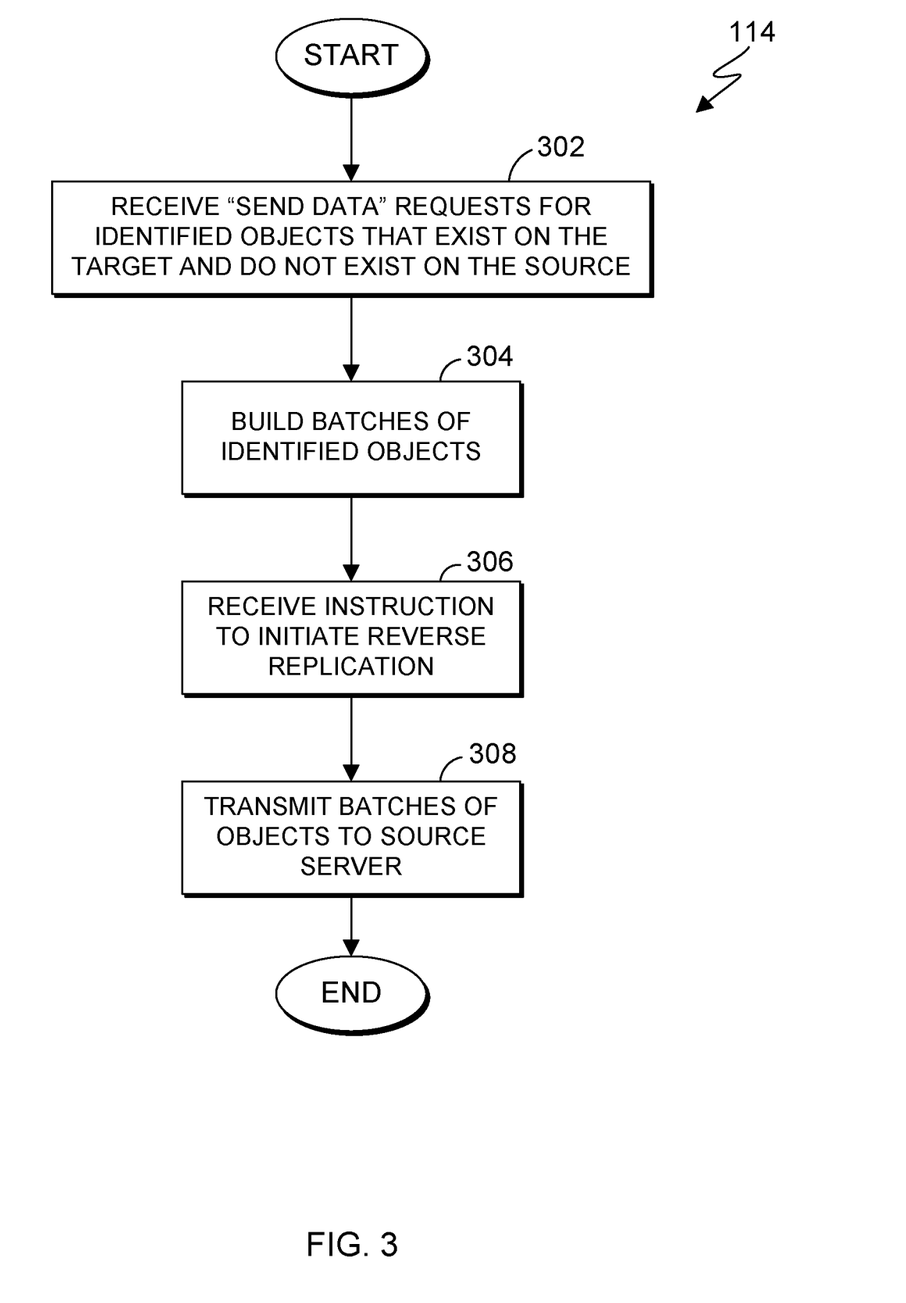
FIG. 3 is a flowchart depicting operational steps of a target replication program, on a target system within the environment of FIG. 1, in accordance with an embodiment of the present invention.

FIG. 3 is a flowchart depicting operational steps of target replication program 114, on target system 112 within the environment 100, in accordance with an exemplary embodiment of the present invention.

In step 302, target replication program 114 receives "send data" requests for the identified objects that exist on target system 112 but do not exist on source system 102. In the exemplary embodiment of FIG. 3, target replication program 114 receives the "send data" requests that were sent by source replication program 104. In certain embodiments, target replication program 114 receives a "send data" for each object that source replication program 104 identifies in step 204. In these embodiments, target replication program 114 maintains a list or table of the identified object which can be used as a reference in order to locate the identified objects and retrieve them to build batches for transmission to source system 102. In various embodiments, the "send data" request also includes instructions to target replication program 114 to build batches of the identified objects in order to facilitate efficient transmission of the objects from target system 112 to source system 102 in a reverse replication process.

In step 304, target replication program 114 builds batches of the identified objects for transmission from target system 112 to source system 102. In the exemplary embodiment, target replication program 114 uses an optimizing algorithm for building batches of objects for efficient transfer to source system 102. Target system 112 accesses the log of "send data" requests that were received, and then locates the objects in target objects 116. The objects retrieved from target objects 116 can be packaged into batches of objects for efficient transmission. Because target system 112 is performing the reverse replication, certain actions that result in increased communication between the source system and the target system can be avoided during the batch building process. For example, target system 112 does not need to validate the presence or location of the data objects. Because target objects 116 are stored within target system 112, target system 112 can access target objects 116 at will. In a reverse replication process controlled by source system 102, communication between source system 102 and target system 112 would be necessary in order to identify and locate the objects for transmission prior to source system 102 building batches.

In step 306, target replication program 114 receives an instruction to initiate a reverse replication process. In the exemplary embodiment of FIG. 3, target replication program 114 receives the instruction to commence replication from a user providing instructions to target system 112, for example, through a user interface. In other embodiments, target replication program 114 can receive the instruction to commence replication based on an automatic instruction generated based on regular time intervals (e.g., daily or hourly replications). In yet other embodiments, target replication program 114 can receive the instruction to commence replication based on a triggering condition. For example, target replication program 114 can receive the instruction to commence replication any time that a threshold number of batches is reached for transmission.

In step 308, target replication program 114 transmits the batches of objects to source system 102. In the exemplary embodiment of FIG. 3, target replication program 114 transmits each batch containing new or updated objects to source system 102 via network 120. Accordingly, source system 102 receives the batches of objects which can be used to add to or replace objects in source objects 106.

Figure 4:
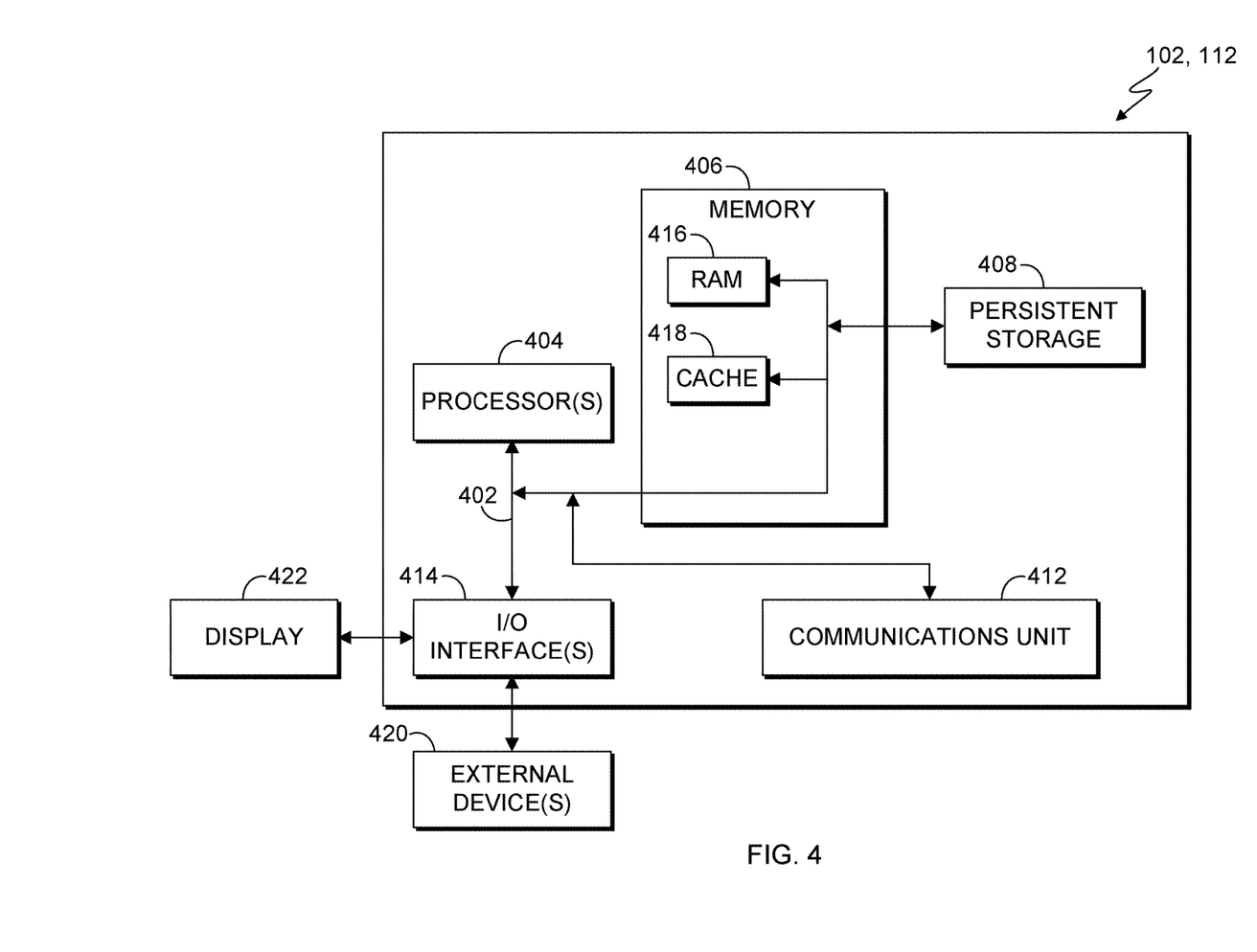
FIG. 4 depicts a block diagram of components of a system in the environment of FIG. 1, in accordance with an embodiment of the present invention.

FIG. 4 depicts a block diagram of components of source system 102 and target system 112, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Source system 102 and target system 112 include communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

Source replication program 104 and target replication program 114 are stored in persistent storage 408 of source system 102 and target system 112, respectively, for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Source replication program 104 and target replication program 114 may be downloaded to persistent storage 408 through communications unit 412.

I/O interface(s) 414 allows for input and output of data with other devices that may be connected to source system 102 and/or target system 112. For example, I/O interface(s) 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention, e.g., source replication program 104 and target replication program 114, can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for replicating data between redundant resources, the computer program product comprising:

one or more computer readable non-transitory storage media; and program instructions stored on the one or more computer readable non-transitory storage media, the program instructions comprising:

program instructions to receive, at a source computer system, an instruction to replicate the source computer system and a target computer system, wherein the source computer system receives the instruction to replicate the source computer system and the target computer system in response to detecting that one or more objects stored in the source computer system have been modified since a previous replication, and wherein the target system is a redundant system that provides a back up to the source system in the event of maintenance or failure of the source system;

program instructions to determine, by the source system, a first list of objects on the source computer system;

program instructions to determine, by the target system, a second list of objects on the target computer system;

program instructions to compare the first list of objects on the source computer system with the second list of objects on the target computer system to identify one or more objects stored in the target computer system that are not stored in the source computer system;

program instructions to alter the roles of the source system and the target system and release control of the replication process for the duration of reverse replication;

program instructions to transmit a request from the source computer system to the target computer system for the one or more identified objects, wherein the request from the source computer system to the target computer system for the one or more identified objects comprises a request in a structured query language;

program instructions to, responsive to transmitting the request from the source computer system to the target computer system for the one or more identified objects, transmit an instruction from the source computer system to the target computer system to build one or more batches of objects comprising the one or more identified objects;

program instructions to generate the one or more batches of objects comprising the one or more identified objects; and program instructions to, responsive to generating, at the target computer, one or more batches of objects comprising the one or more identified objects to commence replication when the number of generated one or more batches exceed a predefined threshold for transmission, transmit the one or more batches of objects from the target computer system to the source computer system.

\* \* \* \* \*